US009552557B2

(12) United States Patent
Ponomarev et al.

(10) Patent No.: US 9,552,557 B2
(45) Date of Patent: Jan. 24, 2017

(54) VISUAL REPRESENTATION OF CHART SCALING

(75) Inventors: Peter Seraphim Ponomarev, Seattle, WA (US); Matthew P. Duignan, Seattle, WA (US); Christina L. Rhodes, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 13/398,603

(22) Filed: Feb. 16, 2012

(65) Prior Publication Data
US 2013/0215154 A1    Aug. 22, 2013

(51) Int. Cl.
G06T 11/20   (2006.01)
G06Q 10/06   (2012.01)
G09G 5/00    (2006.01)

(52) U.S. Cl.
CPC ............ *G06Q 10/06* (2013.01); *G06T 11/206* (2013.01); *G09G 5/00* (2013.01); *G09G 2340/14* (2013.01)

(58) Field of Classification Search
None
See application file for complete search history.

(56) References Cited

U.S. PATENT DOCUMENTS

| 4,958,307 | A |  | 9/1990 | Nishimura |  |
| 5,452,417 | A |  | 9/1995 | Randall et al. |  |
| 5,485,564 | A |  | 1/1996 | Miura |  |
| 6,661,438 | B1 | * | 12/2003 | Shiraishi et al. | 715/835 |
| 6,771,288 | B2 | * | 8/2004 | Boulter | 715/736 |
| 6,990,381 | B2 |  | 1/2006 | Nomura et al. |  |
| 7,269,801 | B2 | * | 9/2007 | Kyle | 715/855 |
| 7,853,403 | B2 | * | 12/2010 | Tanaka | 701/414 |

(Continued)

FOREIGN PATENT DOCUMENTS

| EP | 247743 A2 | 12/1987 |
| JP | S63186152 | 8/1988 |

(Continued)

OTHER PUBLICATIONS

Honeycutt et al., "Windows Vista, Resource Kit, Second Edition," Jul. 2008, Microsoft Press, Second Edition, Chapter 22, pp. 1-5.*

(Continued)

*Primary Examiner* — Andrew G Yang
(74) *Attorney, Agent, or Firm* — Bryan Webster; Dan Choi; Micky Minhas

(57) ABSTRACT

Techniques for visual representation of chart scaling are described. In implementations, a chart is employed to display data associated with a resource. Examples of such a resource include a computer hardware resource, a network resource, a financial resource, a commodity (e.g., a manufactured commodity), and so on. In implementations, a chart is associated with a scale that corresponds to a set of data values represented in the chart. Further, a chart can be rescaled to display data values in a variety of different scales, e.g., that correspond to different sets of data values. In at least some embodiments, a scale mark is provided which provides a visual indication of a scale represented in a chart. When the chart is rescaled, the scale mark is repositioned to indicate a change in scale. Thus, a scale mark can be dynamically repositioned to visually indicate different chart scales.

20 Claims, 7 Drawing Sheets

(56) References Cited

U.S. PATENT DOCUMENTS

| | | | | |
|---|---|---|---|---|
| 8,490,024 | B2* | 7/2013 | Harrison et al. | 715/855 |
| 8,601,388 | B2* | 12/2013 | Barrios et al. | 715/784 |
| 2001/0012008 | A1 | 8/2001 | Hongawa | |
| 2005/0027858 | A1 | 2/2005 | Sloth et al. | |
| 2007/0176933 | A1 | 8/2007 | Culpi et al. | |
| 2007/0204034 | A1 | 8/2007 | Rexroad et al. | |
| 2009/0157699 | A1 | 6/2009 | Ohata et al. | |
| 2009/0177990 | A1* | 7/2009 | Chen et al. | 715/769 |
| 2010/0005411 | A1* | 1/2010 | Duncker et al. | 715/769 |
| 2010/0100071 | A1* | 4/2010 | Ross | 604/508 |
| 2010/0169397 | A1* | 7/2010 | Choi et al. | 708/206 |
| 2010/0194784 | A1* | 8/2010 | Hoff et al. | 345/661 |
| 2010/0318458 | A1* | 12/2010 | West | 705/37 |
| 2011/0099500 | A1* | 4/2011 | Smith et al. | 715/771 |
| 2011/0271172 | A1 | 11/2011 | Radakovitz et al. | |
| 2012/0166996 | A1* | 6/2012 | Leddell et al. | 715/777 |
| 2014/0300603 | A1* | 10/2014 | Greenfield | 345/440 |

FOREIGN PATENT DOCUMENTS

| | | |
|---|---|---|
| JP | H0991035 | 4/1997 |
| JP | 2002062931 | 2/2002 |
| JP | 2004258031 | 9/2004 |
| JP | 2004334183 | 11/2004 |
| JP | 2005196697 | 7/2005 |
| JP | 2005204141 | 7/2005 |
| JP | 2005234291 | 9/2005 |
| JP | 2008216102 | 9/2008 |
| JP | 5314270 | 10/2013 |
| TW | 201203084 | 1/2012 |

OTHER PUBLICATIONS

Russel et al., "Working with Windows® Small Business Server 2011 Essentials," Aug. 2011, Microsoft Press.*

"International Search Report", Mailed Date: Jun. 3, 2013, Application No. PCT/US2013/025796, Filed date: Feb. 13, 2013, pp. 10.

"TDS3000B Series Digital Phosphor Oscilloscopes 071-0957-03", Retrieved at <<http://www2.tek.com/cmswpt/madetails.lotr?ct=Ma& cs=mur&ci=13075&1c=PT-BR>>, TDS3000B Series User Manual, Apr. 22, 2008, pp. 254.

"Agilent 6000 Series Oscilloscope—User's Guide", Retrieved at <<http://www.agilent.com>>, Jun. 2006, pp. 308.

"Real time performance", Retrieved at <<http://www.hdsentinel.com/help/en/15_perf.html>>, Dec. 3, 2010, p. 1.

"Chapter 8—Monitoring Performance", Retrieved at <<http://technet.microsoft.com/en-us/library/cc751451.aspx>>, Mar. 29, 2010, pp. 22.

"Hard Drive Monitoring Software", Retrieved at <<http://www.stellarinfo.com/data-safety-eraser/smart/hard-drive-monitor.php>>, Retrieved Date: Feb. 8, 2012, pp. 2.

"Network Monitor",—Retrieved at <<http://utils.kaspersky.com/special/kis2012/17_kis2012_net_monitor_en.pdf>>, Retrieved Date: Feb. 8, 2012, pp. 11.

"Performance Panel", Retrieved at <<http://www.desktopsidebar.com/htmlhelp/perfmon.html>>, Jan. 13, 2010, pp. 1.

"Foreign Office Action", CN Application No. 201380009619.2, Mar. 16, 2016, 14 pages.

"Search Report Received for European Patent Application No. 13749908.3", Mailed Date: Sep. 3, 2015, 6 Pages.

"Foreign Office Action", CN Application No. 201380009619.2, Nov. 16, 2016, 18 pages.

* cited by examiner

VISUAL REPRESENTATION OF CHART SCALING

BACKGROUND

Charts provide a useful tool for graphically representing data. For example, financial data associated with an enterprise can be represented via a line graph to provide a visual indication of financial aspects of the enterprise. Some techniques for implementing charts, however, have difficulty representing significant fluctuations in data values. For example, if data values fluctuate such that a current scale for a chart cannot represent the data values, the chart may simply rescale to an appropriate scale to represent the fluctuating data values. Such rescaling can be difficult to detect and may go unnoticed by a user. Other techniques may simply utilize a sufficiently large scale such that significant fluctuations in data values do not exceed the scale. Such large scales, however, have difficulty representing finer details that may occur with smaller fluctuations in data values.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for visual representation of chart scaling are described. In implementations, a chart is employed to display data associated with a resource. Examples of such a resource include a computer hardware resource, a network resource, a financial resource (e.g., stocks), a commodity (e.g., a manufactured commodity), and so on. Further, any suitable chart can be utilized, such as a line graph, a histogram, a bar chart, and so on. In implementations, a chart is associated with a scale that corresponds to a set of data values represented in the chart. Further, a chart can be rescaled to display data values in a variety of different scales, e.g., that correspond to different sets of data values.

In at least some embodiments, a scale mark is provided which provides a visual indication of a scale represented in a chart. When the chart is rescaled, the scale mark is repositioned to indicate a change in scale. Thus, a scale mark can be dynamically repositioned to visually indicate different chart scales.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for visual representation of chart scaling are described. In implementations, a chart is employed to display data associated with a resource. Examples of such a resource include a computer hardware resource, a network resource, a financial resource, a commodity (e.g., a manufactured commodity), and so on. Further, any suitable chart can be utilized, such as a line graph, a histogram, a bar chart, and so on. In implementations, a chart is associated with a scale that corresponds to a set of data values represented in the chart. Further, a chart can be rescaled to display data values in a variety of different scales, e.g., that correspond to different sets of data values.

In at least some embodiments, a scale mark is provided which provides a visual indication of a scale represented in a chart. When the chart is rescaled, the scale mark is repositioned to indicate a change in scale. Thus, a scale mark can be dynamically repositioned to visually indicate different chart scales.

Having presented an overview of example implementations in accordance with one or more embodiments, consider now an example environment in which example implementations may by employed.

Example Environment

Figure 1:
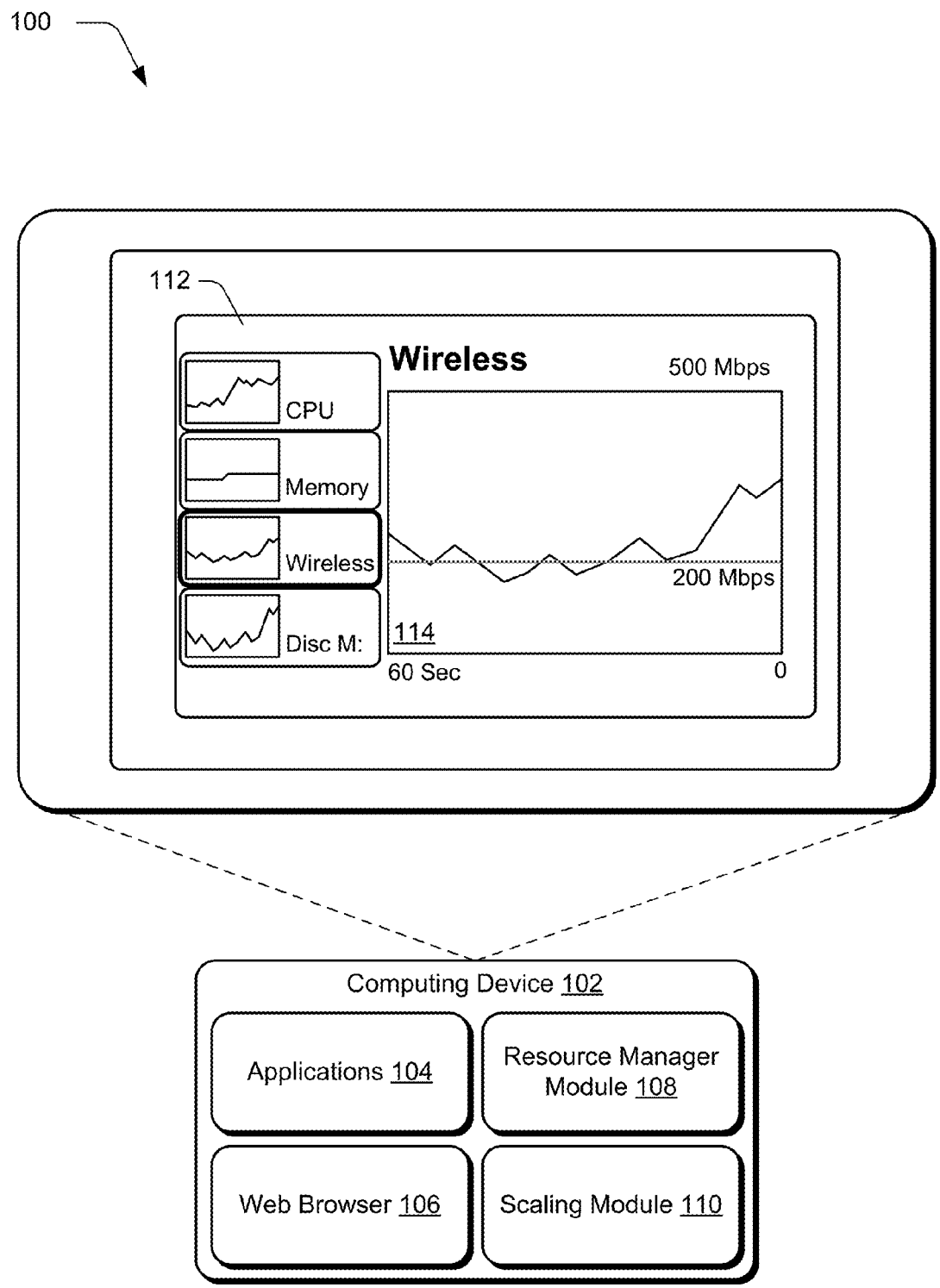
FIG. 1 is an illustration of an environment in an example implementation that is operable to employ techniques discussed herein.

FIG. 1 is an illustration of an environment 100 in an example implementation that is operable to employ techniques described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 8.

Thus, the computing device 102 may range from a full resource device with substantial memory and processor resources (e.g., personal computers, game consoles, slate or tablet-form factor device) to a low-resource device with limited memory and/or processing resources (e.g., traditional set-top boxes, hand-held game consoles). The computing device 102 also includes software that causes the computing device 102 to perform one or more operations as described below.

Computing device 102 includes applications 104, which are representative of functionalities to perform various tasks via the computing device 102. Examples of the applications 104 include a word processor application, an email application, a content editing application, and so on. Further included as part of the computing device 102 is a web browser 106, which is representative of functionality to provide web browsing and/or other tasks via the computing device 102. For example, the web browser 106 can be employed to access network resources (e.g., a website) via one or more networks to which the computing device 102 may connect. Examples of such networks include the Internet, a wide area network (WAN), a local area network (LAN), a wireless network, a public telephone network, an intranet, and so on. The applications 104 and/or the web browser 106 can be implemented in connection with any suitable type of hardware, software, firmware or combination thereof.

The computing device 102 further includes a resource manager module 108 that is representative of functionality to monitor various resources for the computing device and to enable a user to perform actions that affect the various resources. For example, the resource manager module 108 can be employed as part of a diagnostic tool for the computing device 102. Examples of resources includes network resources (e.g., as part of wired and/or wireless network connections), memory resources, data storage resources, processing resources (e.g., a central processing unit (CPU)), and so forth. Resources may also include applications (e.g., the applications 104 and/or the web browser 106), utilities (e.g., system utilities), service hosts, services (e.g., operating system services), visual windows, tabs (e.g., browser tabs), and so on.

Further included as part of the computing device 102 is a scaling module 110, which is representative of functionality to scale graphical elements displayed via the computing device 102. For example, consider a resource user interface (UI) 112, which is associated with the resource manager module 108. As illustrated, the resource UI 112 displays status information for various resources of the computing device 102, such as CPU usage, memory usage, network usage, and so forth.

The resource UI 112 includes a resource chart 114, which displays data about a particular resource associated with the computing device 102. In this particular example, the resource chart 114 displays data transfer rates for a wireless data connection associated with the computing device 102. As explained in more detail below, the scaling module 110 can adjust various graphical elements of the resource chart 114 to provide a visual indication of scale.

Having described an example environment in which the techniques described herein may operate, consider now a discussion of some example implementation scenarios in accordance with one or more embodiments.

Example Implementation Scenarios

The following discussion describes some example implementation scenarios for providing visual representation of chart scaling in accordance with one or more embodiments. In portions of the following discussion, reference will be made to the environment 100 of FIG. 1.

Figure 2:
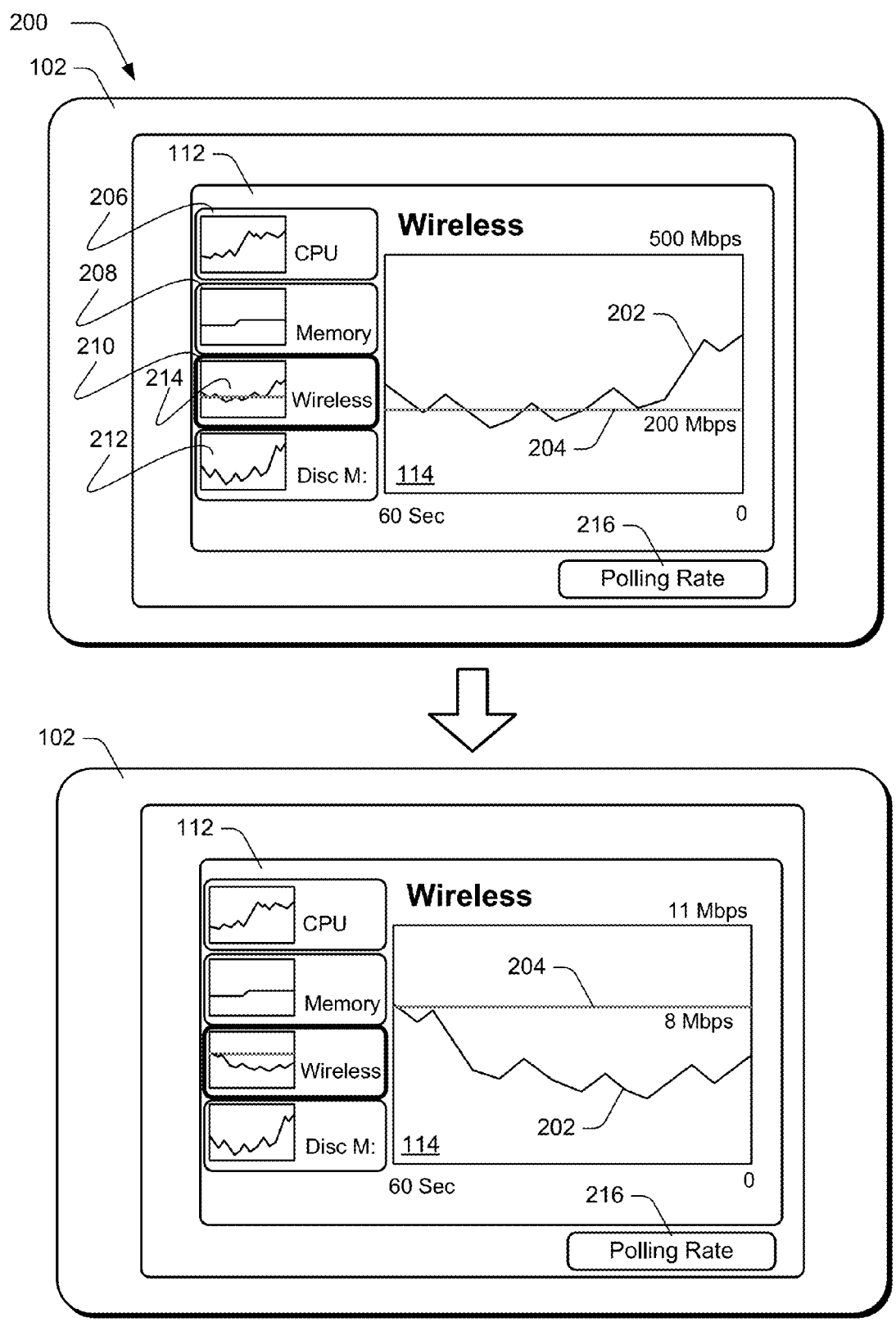
FIG. 2 illustrates an example implementation scenario in accordance with one or more embodiments.

FIG. 2 illustrates an example implementation scenario, general at 200. In the upper portion of the scenario 200, the resource UI 112 is displayed on a display apparatus of the computing device 102. As mentioned above, the resource UI 112 includes a resource chart 114, which is configured to display data about different resources associated with the computing device 102. For example, the resource UI 112 can be implemented by the resource manager module 108. The resource chart 114 includes a data line 202, which tracks data points for a particular resource. In this example, the data line 202 tracks data transfer rates (e.g., for outgoing and/or incoming data) for a wireless data connection associated with the computing device 102.

For example, the portion of the data line 202 at the right side of the resource chart 114 (e.g., at time zero (0)) indicates a current data transfer rate. Following the data line 202 leftward from the right side, the data line 202 indicates previous data transfer rates, e.g., for previous points in time.

Continuing to the left side of the resource chart 114, the data line 202 indicates a data transfer rate that occurred 60 seconds previous, e.g., 60 seconds previous to time 0. This particular data display time period (e.g., 60 seconds) is presented for purposes of example, and it is to be appreciated that implementations can track and/or display resource data over a variety of different time periods.

The resource chart 114 is configured to display data values within a particular "scale," which refers to a range of values that are represented in the resource chart 114. In this particular example, the scale of the resource chart 114 starts at 0 (zero) megabits per second (Mbps) at the bottom of the resource chart, and goes up to 500 Mbps at the top of the resource chart. Thus, this example implementation of the resource chart 114 can display network data rate transfer values from 0 Mbps to 500 Mbps. As discussed in detail below, the scale of the resource chart 114 can be adjusted to enable values in a variety of different value ranges to be visually represented.

Further included as part of the resource chart 114 is a scale mark 204, which provides a visual indication of a scale for the resource chart 114. For example, the relative position of the scale mark 204 within the resource chart 114 can visually represent the scale of data values included in the resource chart 114. In this example scenario, the scale mark 204 is positioned to indicate the scale of 0-500 Mbps. Further, the scale mark 204 is vertically oriented to correspond to a value of 200 Mbps within the given scale. When the scale of the resource chart 114 changes to a different scale, the position of the scale mark 204 can be adjusted within the resource chart 114 to visually represent the transition to the different scale.

The resource UI 112 further includes indicia of different resources, such as a resource indicium 206 that is associated with a CPU, a resource indicium 208 that is associated with a memory resource, a resource indicium 210 that is associated with the wireless resource represented by the resource chart 114, and a resource indicium 212 that is associated with a data storage (e.g., "disc") resource. The resource indicium 210 is illustrated as being in a selected state, as indicated by the bolded border of the resource indicium 210. In implementations, an indication that a resource indicium is currently selected indicates that a resource associated with the resource indicium is currently "in focus," e.g., that the resource chart 114 is currently displaying data for the resource.

The resource indicia include sub-charts that indicate data values associated with their respective resources. For example, the resource indicium 206 includes a sub-chart that indicates values for CPU usage, such as indicated as a percentage of total CPU processing capacity. In at least some implementations, the sub-charts included as part of the resource indicia indicate real-time values for their respective resources.

Sub-charts included as part of a particular resource indicium can include a scale marks that provide a visual indication of a scale for the respective sub-chart. For example, the resource indicium 210 includes a scale mark 214 that indicates a scale for data values displayed in the sub-chart included as part of the resource indicium 210. In implementations, scale marks included as part of sub-charts for resource indicia can be implemented and managed according to various techniques discussed herein.

In the scenario 200, the resource chart 114 corresponds to a resource that is currently "in-focus" in the resource UI 112. In at least some implementations, a resource associated with the resource chart 114 can be changed to enable data associated with different resources to be viewed. For example, the resource indicia 206, 208, and 212 can be selectable to cause an associated resource to be brought into focus in place of the current resource in focus such that data for the associated resource can be displayed in the resource chart 114.

Further illustrated in the resource UI 112 is a rate control 216, which is selectable to enable a polling rate for the resource UI 112 to be configured. In implementations, the scaling module 110 can periodically poll (e.g., check) for data values for a resource to determine if an appropriate scale is being used to display the data values, e.g., as part of the data line 202. Thus, a "polling rate" refers to a rate at which (e.g., how often) the scaling module 110 performs such polling. For example, selecting the rate control 216 can cause a graphical user interface to be presented that enables a user to select a polling rate. A wide variety of different polling rates may be utilized, such as every one-half of a second, every second, every two seconds, every ten seconds, and so on. Additionally or alternatively, a polling rate can be automatically selected, e.g., by the resource manager module 108 and/or the scaling module 110.

Continuing to the bottom portion of the scenario 200, the resource chart 114 is rescaled to a different range of data values. For example, the resource chart 114 is rescaled to correspond to a data value range of 0 Mbps to 11 Mbps. The change in the scale can be indicative of a change in data values for an associated resource. In this example, the change in the scale corresponds to a drop in the data transfer rate of the wireless connection.

To indicate the change in the scale, the scale mark 204 is repositioned in the resource chart 114. In this example, the scale mark 204 is repositioned towards the top of the resource chart 114. As mentioned above, the relative position of the scale mark 204 within the resource chart 114 can visually represent the scale of data values included in the resource chart 114. For example, a distance between the top of the resource chart 114 and the scale mark 204 can be relative to a particular scale. In at least some implementations, a smaller distance indicates a smaller scale, and a larger distance indicates a larger scale. This implementation is presented for purposes of example only, and the scale mark 204 can be positioned based on a variety of different positioning algorithms and/or criteria. For example, in alternative implementations, a larger distance between the scale mark 204 and the top of the resource chart 114 can indicate a smaller scale.

Figure 3:
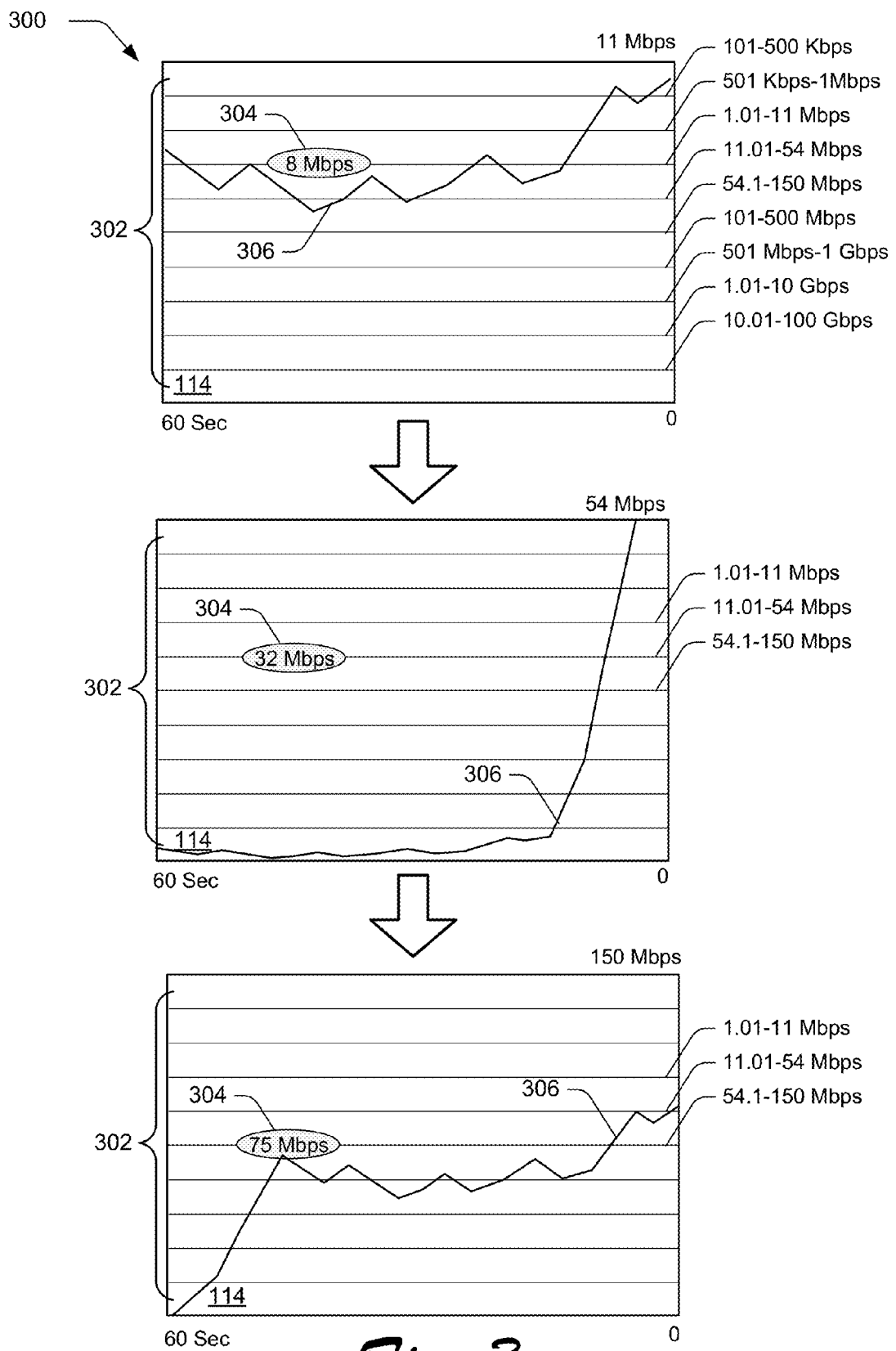
FIG. 3 illustrates an example implementation scenario in accordance with one or more embodiments.

FIG. 3 illustrates another example implementation scenario, general at 300. In the scenario 300, the resource chart 114 is illustrated without other portions of the resource UI 112 to enable aspects of the resource chart to be illustrated in more detail.

At the top of the scenario 300, the resource chart 114 is displayed with a set of scale lines 302. In implementations, the scale lines 302 correspond to different data value scales that can be represented via the resource chart 114. The scale lines 302 in this example are associated with ranges of actual data transfer rates, as indicated by the example ranges listed to the right of the resource chart 114. For example, if a data transfer rate for a resource falls into a particular one of the ranges, the resource chart 114 can be rescaled to a scale that corresponds to the particular range. A table with example correlations between ranges of values and scales is presented below.

Further illustrated is a scale mark 304, which is positioned to indicate a current scale for the resource chart 114. As illustrated, the scale mark 304 differs visually from the scale mark 204, discussed above with reference to FIG. 2. Thus, a wide variety of different types and forms of scale marks can be employed according to the claimed embodiments.

A data line 306 indicates data transfer rates for a particular device (e.g., the computing device 102) that occur within this range of values. As illustrated, the scale mark 304 is positioned on a scale line that corresponds to a data transfer rate scale of 0-11 Mbps. In implementations, a data value associated with a scale mark on a chart can be proportional to the position of the scale mark on the chart. For example, as illustrated here, the scale mark 304 is positioned at a scale line for a data value of 8 Mbps, which corresponds to approximately 8/11 of the scale of the current scale of 11 Mbps.

Further to the scenario 300, a data transfer rate for the device increases such that the resource chart 114 is to be rescaled. For example, the data transfer rate increases to within a range of 54.1-150 Mbps. Proceeding to the center portion of the scenario 300 and further to rescaling the resource chart 114, the scale mark 304 is first repositioned to the next scale line downward to a scale line for a scale of 0-54 Mbps.

In implementations, a rescaling operation can be incremented one scale at a time until a current scale level is reached. For example, instead of jumping past an intermediate scale level to reach a current scale level in one operation, a rescaling operation can proceed step-wise between intermediate scales until a current scale level is reached. In implementations, each step of a step-wise rescaling can occur at a particular polling period. For example, if the resource chart 114 is set to perform a polling operation once a second, each step of a step-wise rescaling can occur each second along with successive polling operations until the scale reaches the new scale. As discussed below, however, in some rescaling scenarios a jump can occur such that one or more intermediate scale levels are skipped during a rescaling operation.

As also illustrated in the center portion of the scenario 300, the data line 306 is adjusted to correspond to the change in scale. For example, previous data points included as part of the data line 306 can be adjusted according to the positions of the data points based on a new scale.

Proceeding to the lower portion of the scenario 300, the scale mark 304 is repositioned to the next line downward to correspond to the current scale level of 0-150 Mbps. Thus, the resource chart 114 can be rescaled to correspond to a variety of different scales, and the scale mark 304 can be dynamically repositioned to provide a visual indication of such rescaling.

As discussed elsewhere herein, in alternative implementations when a rescaling occurs across multiple different scales, a scale mark can jump across the multiple different scales to a position that corresponds to a current scale. For example, with reference to the scenario 300, the scale mark 304 can jump from the position indicated in the upper portion of the scenario 300 to the position indicated in the lower portion, without incrementing to the position indicated in the center portion. Thus, jumps across large scale differences can be indicated via repositioning of a scale mark.

Presented below is a table with example correlations between ranges of values and corresponding scales.

| Range of Values | Scale | Scale Mark | Position |
| --- | --- | --- | --- |
| 0-100 Kbps | 100 Kbps | None | N/a |
| 101-500 Kbps | 500 Kbps | 450 Kbps | 9/10 |

-continued

| Range of Values | Scale | Scale Mark | Position |
|---|---|---|---|
| 501 Kbps-1 Mbps | 1 Mbps | 800 Kbps | 8/10 |
| 1.01-11 Mbps | 11 Mbps* | 8 Mbps | 7/10 |
| 11.01-54 Mbps | 54 Mbps* | 32 Mbps | 6/10 |
| 54.1-150 Mbps | 150 Mbps* | 75 Mbps | 5/10 |
| 101-500 Mbps | 500 Mbps | 200 Mbps | 4/10 |
| 501 Mbps-1 Gbps | 1 Gbps | 300 Mbps | 3/10 |
| 1.01-10 Gbps | 10 Gbps | 2 Gbps | 2/10 |
| 10.01-100 Gbps | 100 Gbps | 10 Gbps | 1/10 |

Units for the scale are: kilobytes per second (Kbps), megabytes per second (Mbps), and gigabytes per second (Gbps).

The first column ("Range of Values") includes ranges of values that can be observed, e.g., wireless data transfer rates that can be observed for a wireless resource. The second column ("Scale") indicates a scale that corresponds to the range of values. For example, if data values for a resource are observed in a particular range of values, a resource chart associated with the resource can be scaled to a corresponding scale.

The third column ("Scale Mark") indicates a data value associated with a position of a scale mark for the particular scale. The fourth column ("Position") indicates a scale line on which a scale mark can be positioned to provide a visual indication of the corresponding scale. In implementations, a particular position can indicate a number of lines from a bottom of a resource chart a scale mark is to be positioned to indicate a corresponding scale. For example, according to the table, a scale mark is to be positioned on a second line from the bottom of a resource chart to indicate a scale of 0-10 Gbps.

The table above is presented for purposes of example only, and a wide variety of different values, scales, scale marks, and positions may be implemented according to the claimed embodiments.

Having discussed some example implementation scenarios, consider now some example procedures in accordance with one or more embodiments.

Example Procedures

The following discussion describes example procedures for visual representation of chart scaling in accordance with one or more embodiments. In portions of the following discussion, reference will be made to the environment 100 of FIG. 1 and the example implementation scenarios discussed above.

Figure 4:
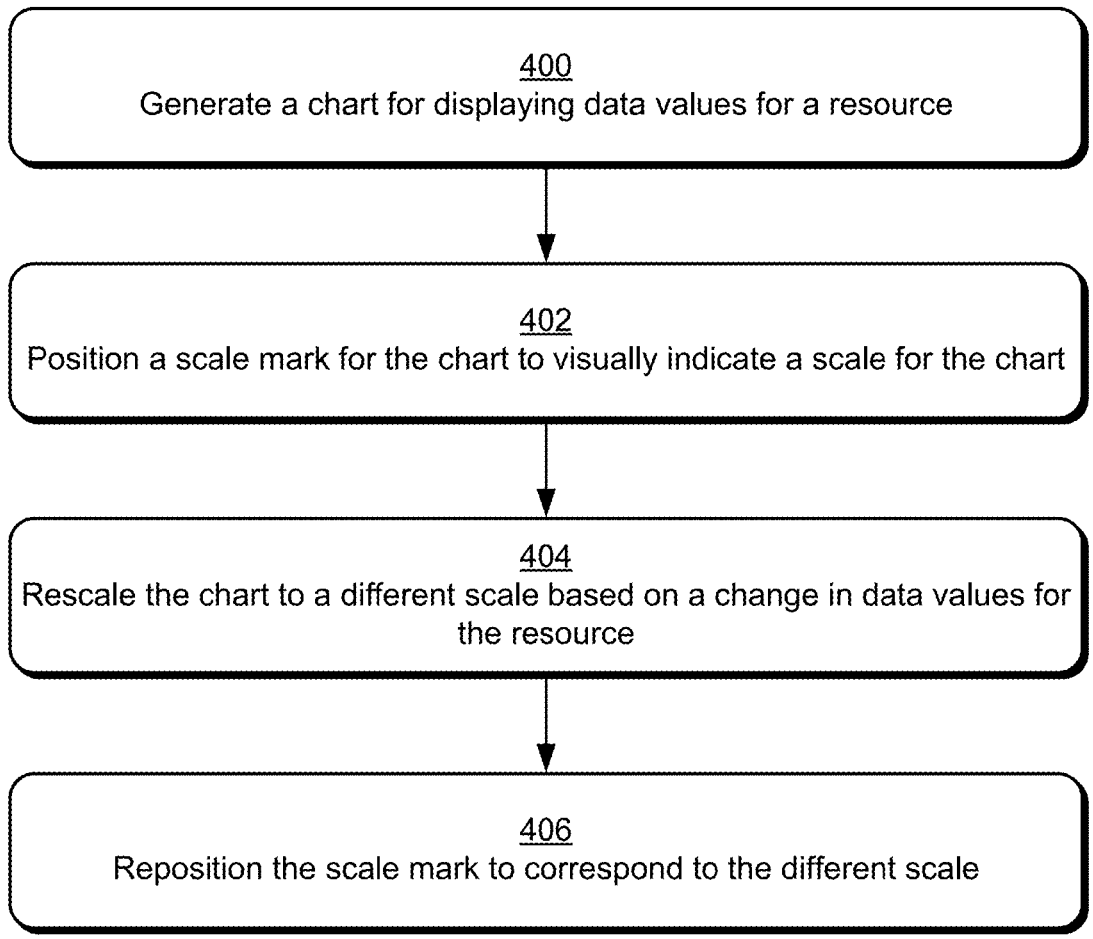
FIG. 4 is a flow diagram that describes steps in a method in accordance with one or more embodiments.

FIG. 4 is a flow diagram that describes steps in a method in accordance with one or more embodiments. Step 400 generates a chart for displaying data values for a resource. As discussed above, data values for a wide variety of different resources can be tracked according to techniques discussed herein.

Step 402 positions a scale mark for the chart to visually indicate a scale for the chart. For example, the scaling module 110 can query the resource manager module 108 and/or other entity for data values for a resource. The scale can be selected by correlating the data values with pre-specified sets of data values. Examples of pre-specified sets of data values are illustrated in FIG. 3. Alternatively or additionally, a set of data values that is used to scale a chart can be generated "on the fly," such as when data value readings are taken for a resource.

Step 404 rescales the chart to a different scale based on a change in data values for the resource. For example, the scaling module 110 can ascertain that data values for the resource have transitioned from one scale to a different scale, and can rescale the chart to correspond to the different scale. Step 406 repositions the scale mark to correspond to the different scale. As referenced above, a wide variety of different scale marks and scale mark positions may be utilized in accordance with the claimed embodiments.

Figure 5:
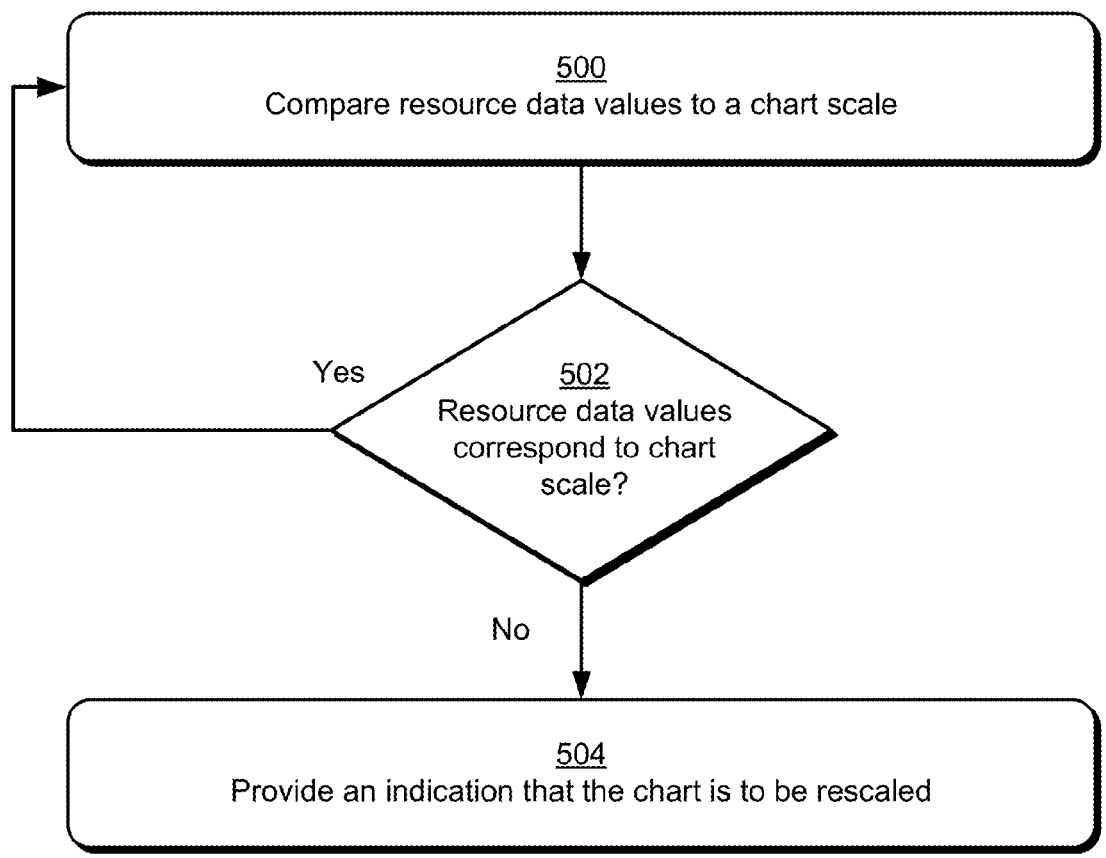
FIG. 5 is a flow diagram that describes steps in a method in accordance with one or more embodiments.

FIG. 5 is a flow diagram that describes steps in a method in accordance with one or more embodiments. In implementations, the method describes an example way of implementing at least a portion of step 404, discussed above with reference to FIG. 4.

Step 500 compares resource data values to a chart scale. For example, the scaling module 110 can periodically poll the resource manager 108 and/or other entity for data values for a resource. As discussed above, a polling rate can be user-specified and/or automatically specified, e.g., by the scaling module 110. The scaling module 110 can compare current resource data values to a current scale for a chart.

Step 502 ascertains whether the resource data values correspond to the chart scale. For example, the scaling module 110 can ascertain whether the resource data values are within a set of chart data values associated with the current chart scale. Example correlations between data values for a resource and chart scales are discussed in the table presented above in the discussion of FIG. 3.

The scaling module 110 may also ascertain whether the resource data values are within a certain value proximity to a highest chart data value and/or a lowest chart data value. For example, the scaling module can ascertain whether the resource data values are within a certain value percentage of the highest chart data value and/or a lowest chart data value.

If the resource data values correspond to the chart scale ("Yes"), the method returns to step 500. For example, the scaling module 110 can ascertain that the resource data values are within a set of chart data values associated with the chart scale. Thus, the method can continue to poll for resource data values and determine whether the resource data values correspond to chart scale.

If the resource data values do not correspond to the chart scale ("No"), step 504 provides an indication that the chart is to be rescaled. For example, the scaling module 110 can ascertain that the resource data values are not within a set of chart data values associated with the chart scale. Alternatively or additionally, the scaling module 110 can ascertain that the resource data values are within a certain value proximity to a highest chart data value and/or a lowest chart data value.

For example, consider a scenario where a chart is scaled to values ranging from 0 to 10. If resource data values are within a certain proximity to 0, such as within a range of 0 to 0.5, a data line and/or other data value indicator can be difficult to visually ascertain since the data value indicator may be visually very close to an edge of the chart. Further to this example, if resource data values are within a certain proximity to 10, such as within a range of 9.5 to 10, a data line and/or other data value indicator may also be difficult to visually ascertain. Thus, in such a scenario, the scaling module 110 can provide an indication that the chart is to be rescaled to correspond to the resource data values.

In implementations, a time threshold can be employed as part of ascertaining whether the resource data values correspond to the chart scale. If the resource data values are outside of the chart scale for more than the time threshold, the resource data values can be considered as not corresponding with the chart scale. Alternatively or additionally, if the resource data values are within a certain value proximity to a highest chart data value and/or a lowest chart data value for more than the time threshold, the resource data values can be considered as not corresponding with the chart scale.

For example, consider an example where the chart is configured to display resource data values over a 60 second period. A time threshold of 15 seconds can be specified for the chart. Thus, if the resource data values are outside of the chart scale for more than 15 seconds, the resource data values can be considered to not correspond to the chart scale. Further, if the resource data values fall outside of the chart scale and then return to within the chart scale within 15 seconds, the resource data values can be considered to correspond to the chart scale.

Figure 6:
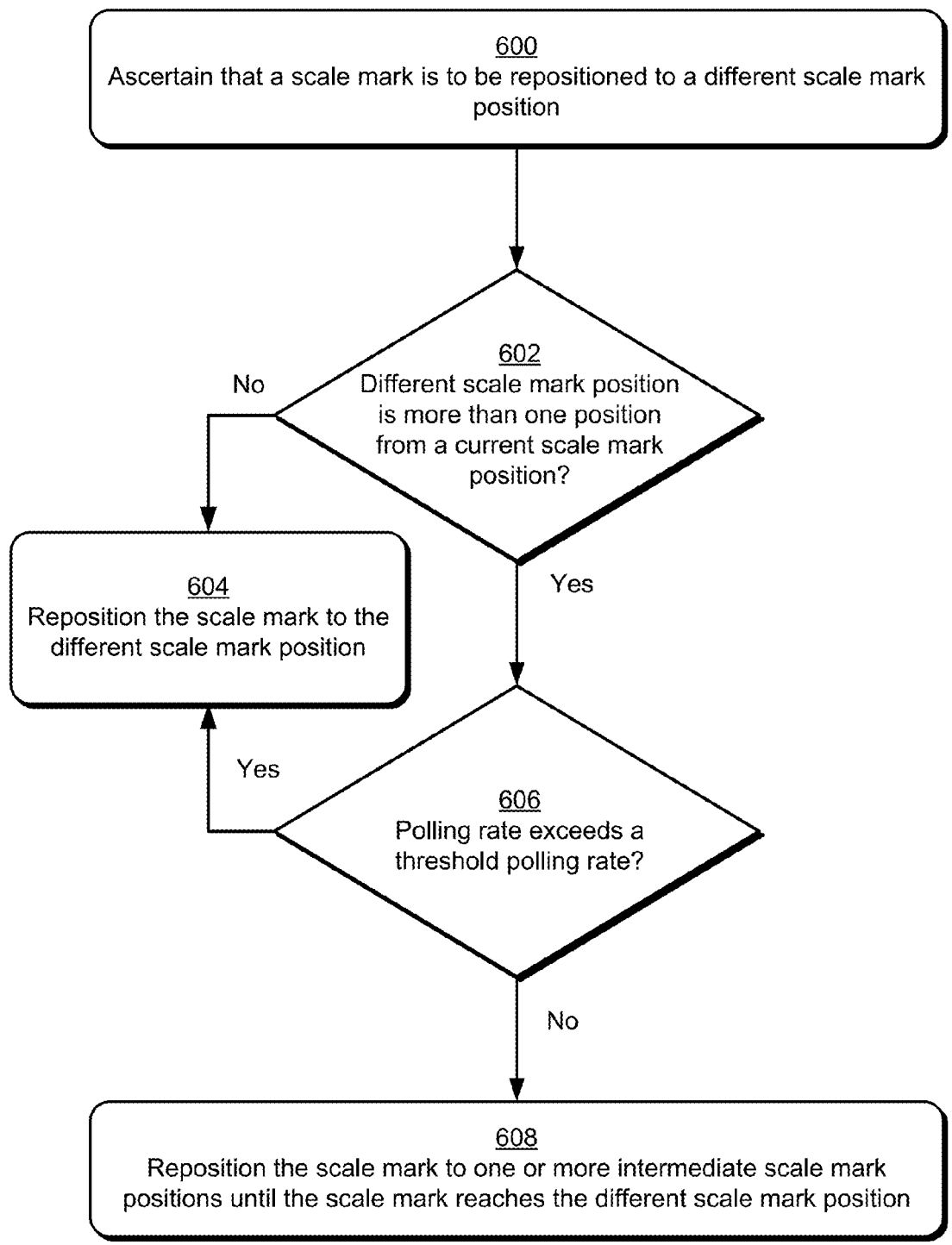
FIG. 6 is a flow diagram that describes steps in a method in accordance with one or more embodiments.

FIG. 6 is a flow diagram that describes steps in a method in accordance with one or more embodiments. In implementations, the method describes an example way of implementing at least a portion of step 406, discussed above with reference to FIG. 4.

Step 600 ascertains that a scale mark is to be repositioned to a different scale mark position. For example, the scaling module 110 can ascertain that a chart is rescaling and that a scale mark for the chart is to be repositioned in response to the rescaling. As discussed above, a chart can display data values for a resource that is associated with multiple different scales of data values, and the different scales can include respective sets of data values. Thus, a chart can employ different scale mark positions to indicate different scales for the chart. In implementations, the scale mark positions can correspond to the scale lines discussed above with reference to FIG. 3.

Step 602 determines whether the different scale mark position is more than one position from a current scale mark position. For example, when a chart rescaling involves multiple scales, one or more intermediate scale mark positions may exist between a current scale mark position and a new scale mark position to which a scale mark is to be repositioned.

If the different scale mark position is not more than one position from the current scale mark position ("No"), step 604 repositions the scale mark to the different scale mark position. For example, the scaling module 110 can reposition the scale mark in conjunction with a polling operation, examples of which are discussed above. Thus, in implementations, scale mark repositioning can be configured to be implemented according to a polling rate such that when a polling operation occurs, a scale mark can be repositioned to a scale mark position that corresponds to a current scale.

If the different scale mark position is more than one position from the current scale mark position ("Yes"), step 606 ascertains whether a polling rate exceeds a threshold polling rate. As discussed above, different polling rates can be specified to indicate how often checks for rescaling are to be made. A threshold polling rate can be specified that is used to determine how particular operations are implemented, such as chart rescaling and scale mark repositioning operations. In implementations, the threshold polling rate can be pre-specified by a user and/or automatically specified, e.g., by the scaling module 110.

If the polling rate does not exceed the threshold polling rate ("No"), step 608 repositions the scale mark to one or more intermediate scale mark positions until the scale mark reaches the different scale mark position. For example, the scale mark can be successively repositioned to the one or more intermediate scale mark positions in conjunction with successive polling operations until the scale mark reaches the different scale mark position.

If the polling rate does exceed the threshold polling rate ("Yes"), step 604 repositions the scale mark to the different scale mark position. For example, the scale mark can jump one or more intermediate scale mark positions to the different scale mark position. Thus, instead of incrementally repositioning the scale mark across one or more intermediate scale mark positions, the scale mark can be repositioned from a current position to the different position. In implementations, such repositioning can occur in conjunction with a single polling operation.

Having discussed some example procedures, consider now a discussion of an example system and device in accordance with one or more embodiments.

Example System and Device

Figure 7:
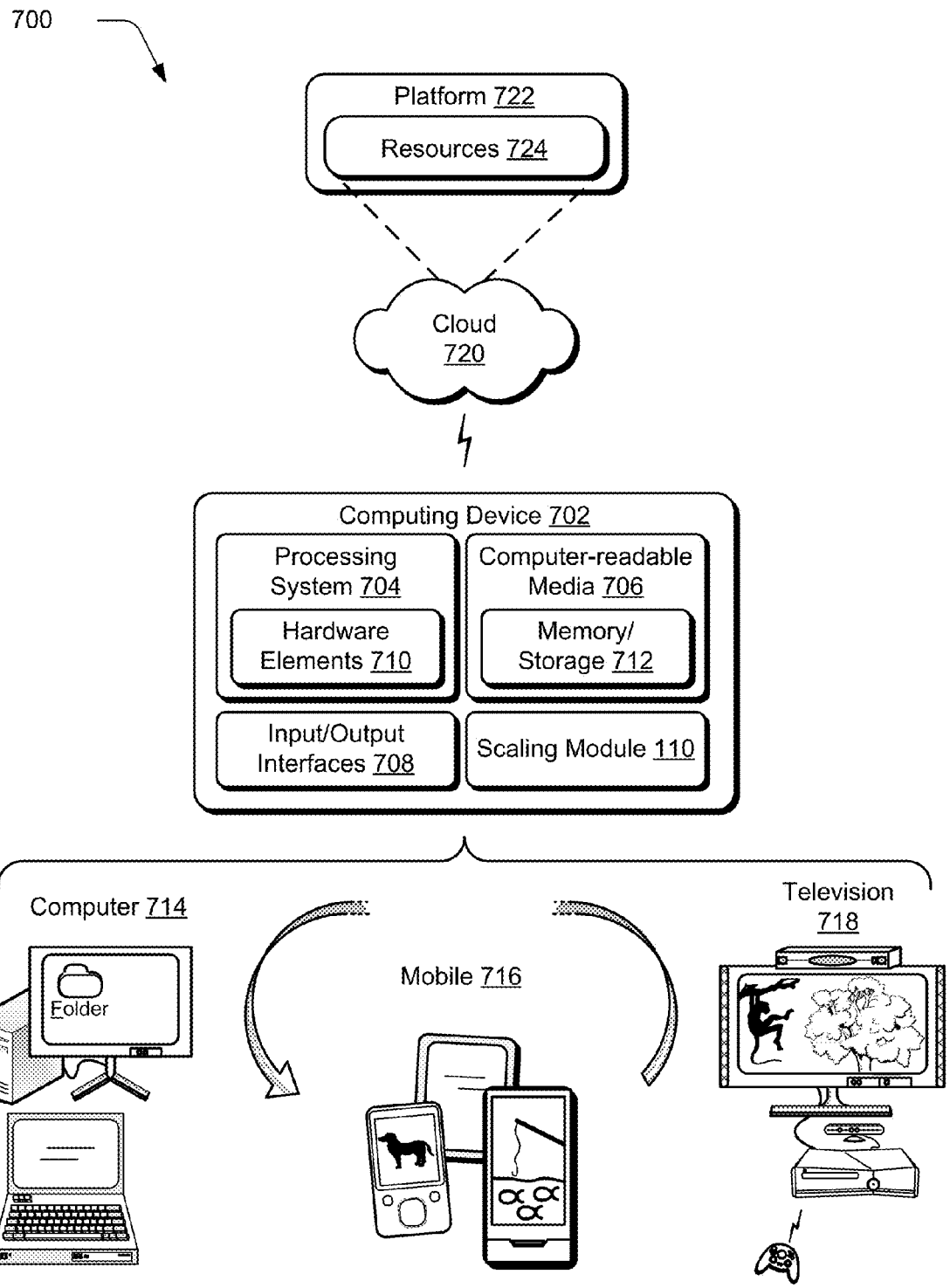
FIG. 7 illustrates an example system and computing device as described with reference to FIG. 1, which are configured to implement embodiments of techniques described herein.

FIG. 7 illustrates an example system generally at 700 that includes an example computing device 702 that is representative of one or more computing systems and/or devices that may implement various techniques described herein. For example, the client device 102 discussed above with reference to FIG. 1 can be embodied as the computing device 702. The computing device 702 may be, for example, a server of a service provider, a device associated with the client (e.g., a client device), an on-chip system, and/or any other suitable computing device or computing system.

The example computing device 702 as illustrated includes a processing system 704, one or more computer-readable media 706, and one or more Input/Output (I/O) Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media does not include signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules that are executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. For example, functionalities discussed with reference to the client device 102 and/or the scaling module 110 may be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Conclusion

Techniques for visual representation of chart scaling are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more computer-readable storage media having instructions stored thereon that, responsive to execution by a computing device, cause the computing device to perform operations comprising:
    detecting a change in data values for a resource automatically;
    rescaling a chart that is configured to track the data values for the resource to a different scale in response to said detecting, said different scale being one of a preset number of scales defined for the resource, the chart comprising scale lines that correspond to different scales; and
    repositioning, in response to said rescaling, a scale mark from one scale line to a different scale line to visually represent a transition to the different scale within a portion of the chart in which the data values for the resource are indicated to a different position for the different scale to visually represent the different scale, the scale mark including a data value that corresponds to the different position relative to data values of the different scale, and being positioned separate from a border of the chart.

2. One or more computer-readable storage media as described in claim 1, wherein the resource comprises a computing device resource, and wherein the operations further comprise ascertaining that the chart is to be rescaled based on a change in resource data values for the computing device resource.

3. One or more computer-readable storage media as described in claim 1, wherein the operations further comprise dynamically repositioning the scale mark based on the chart being rescaled to multiple different scales.

4. One or more computer-readable storage media as described in claim 1, wherein the operations further comprise ascertaining that the chart is to be rescaled by:
    comparing resource data values to chart data values associated with a chart scale; and
    determining that the resource data values do not correspond to the chart data values.

5. One or more computer-readable storage media as described in claim 1, wherein the different scales correspond to different sets of the data values for the resource.

6. One or more computer-readable storage media as described in claim 1, wherein the operations further comprise repositioning the scale mark by:
    determining that the scale mark is to be repositioned to a different scale mark position that is more than one scale mark position from a current position of the scale mark; and
    positioning the scale mark at one or more intermediate scale mark positions until the scale mark reaches the different scale mark position.

7. One or more computer-readable storage media as described in claim 1, wherein the operations further comprise:
    ascertaining that the chart is to be rescaled based on polling for changes in the data values according to a pre-determined polling rate; and
    repositioning the scale mark based on the polling rate.

8. One or more computer-readable storage media as described in claim 1, further comprising displaying a rate control that is selectable to enable a user to specify a rate at which a polling operation is performed to check if the chart is to be rescaled.

9. A computer-implemented method, comprising:
positioning a scale mark to a position for a chart to visually indicate a scale for the chart, the scale being one of a preset number of scales predefined based on data values associated with a resource, the chart comprising scale lines that correspond to different scales;
rescaling the chart to a different scale based on a change in the data values for the resource;
repositioning, by a computing device and independent of user interaction, the scale mark to a different position on a different scale line to visually represent a transition to the different scale that corresponds to the different scale, the different position being separate from a border of the chart and contained within the chart; and
causing to be displayed as part of the scale mark a data value that corresponds to the different position relative to data values represented by the different scale, the data value displayed in conjunction with the scale mark within a portion of the chart in which data values for the resource are indicated.

10. A method as described in claim 9, wherein the scale and the different scale are associated with different discrete sets of the data values associated with the resource.

11. A method as described in claim 9, wherein the chart includes multiple different positions in which the scale mark can be positioned, each of the multiple different positions corresponding to a particular scale, wherein said repositioning comprises repositioning the scale mark to at least one of the multiple different positions.

12. A method as described in claim 9, wherein said rescaling is responsive to ascertaining that the one or more data values for the resource do not correspond to the scale for the chart, said ascertaining comprising at least one of:
ascertaining that one or more of the data values are outside of a set of chart data values associated with the scale; or
ascertaining that the one or more of the data values are within a certain value proximity to a highest chart data value and/or a lowest chart data value associated with the scale.

13. A method as described in claim 9, wherein said repositioning comprises:
determining that the scale mark is to be repositioned to a different scale mark position that corresponds to the different scale and that is more than one scale mark position from a current position of the scale mark; and
incrementally positioning the scale mark at one or more intermediate scale mark positions until the scale mark reaches the different scale mark position, the intermediate scale mark positions corresponding to one or more intermediate scales between the scale and the different scale.

14. A method as described in claim 9, wherein said repositioning comprises:
determining that a different scale mark position to which the scale mark is to be repositioned is more than one position from a current scale mark position;
responsive to said determining, ascertaining whether a polling rate at which checks for rescaling are performed exceeds a threshold polling rate; and
if the polling rate does not exceed the threshold polling rate, repositioning the scale mark to one or more intermediate scale mark positions until the scale mark reaches the different scale mark position; or
if the polling rate exceeds the threshold polling rate, repositioning the scale mark to the different scale mark position without incrementing the scale mark to the one or more intermediate scale mark positions.

15. A system comprising:
one or more processors; and
one or more computer-readable storage media having instructions stored thereon that, responsive to execution by the one or more processors, cause the system to implement a graphical user interface (GUI) including:
a resource chart configured to display data values for a resource; and
a scale mark, located at one of a preset number of scale mark positions predefined for the resource, the scale mark configured to be adjusted dynamically and independent of user interaction to a different one of the preset number of scale mark positions responsive to a rescaling of the resource chart, the preset number of scale mark positions providing a visual indication of different scales and the scale mark positions being separate from a border of the chart and displayed within a portion of the chart in which data values for the resource are indicated.

16. A system as recited in claim 15, wherein the GUI comprises scale lines that correspond to the different scales, and wherein the scale mark is configured to be dynamically adjusted to different positions of the scale lines to visually indicate which of the different scales is a current scale for the resource chart.

17. A system as recited in claim 15, wherein the scale mark is configured to be dynamically adjusted to different positions within the resource chart to provide a visual indication that the resource chart is scaled to a particular scale of the different scales.

18. A system as recited in claim 15, wherein the GUI comprises one or more resource indicia associated with at least one different resource, at least one of the resource indicia including:
a sub-chart that indicates data values for the at least one different resource associated with the one or more resource indicia; and
a different scale mark associated with the sub-chart that provides a visual indication of a scale for the sub-chart.

19. A system as recited in claim 15, wherein the GUI comprises a rate control that, if selected, enables a user to specify a rate at which a polling operation is performed to check if the resource chart is to be rescaled.

20. A system as recited in claim 15, wherein the GUI is implemented as part of a diagnostic tool for a computing device, and wherein the resource comprises at least one of a hardware resource or a network resource for the computing device.

* * * * *